United States Patent [19]

Derrien

[11] Patent Number: 5,356,162
[45] Date of Patent: Oct. 18, 1994

[54] RETRACTABLE RUNNING GEAR FOR A VEHICLE THAT IS SUPPORTED WITHOUT CONTACT

[75] Inventor: Michel Derrien, Versailles, France

[73] Assignee: Messier-Bugatti, Velizy-Villacoublay, France

[21] Appl. No.: 945,364

[22] Filed: Sep. 16, 1992

[30] Foreign Application Priority Data

Sep. 17, 1991 [FR] France .................. 91 11436

[51] Int. Cl.5 ................................. B60G 25/00
[52] U.S. Cl. .................... 280/43.18; 280/43.23; 280/704; 267/227
[58] Field of Search ........... 280/43.17, 43.18, 43.23, 280/43.24, 764.1, 766.1, 767; 172/407, 418, 423; 267/32, 227

[56] References Cited

U.S. PATENT DOCUMENTS

| | | | |
|---|---|---|---|
| 1,151,771 | 8/1915 | Erickson | 267/227 X |
| 1,650,742 | 11/1927 | Rowan | 267/227 X |
| 2,973,818 | 3/1961 | Marvin | 280/43.24 X |
| 3,001,796 | 9/1961 | Martin | 280/43.18 |
| 3,390,895 | 7/1968 | Verdi | 280/704 |
| 3,779,574 | 12/1973 | Ow . | |
| 4,043,403 | 8/1977 | Anderson et al. | 280/43.23 X |
| 4,065,153 | 12/1977 | Pringle . | |
| 4,102,424 | 7/1978 | Heinze | 280/43.18 X |
| 4,618,307 | 10/1986 | Kress et al. | 280/43.23 X |

FOREIGN PATENT DOCUMENTS

| | | | |
|---|---|---|---|
| 0641876 | 8/1928 | France | 267/227 |
| 2443369 | 7/1980 | France . | |
| 2528364 | 12/1983 | France . | |
| 2657302 | 7/1991 | France . | |
| 675307 | 7/1952 | United Kingdom . | |
| 2134052 | 8/1984 | United Kingdom . | |

*Primary Examiner*—Brian L. Johnson
*Attorney, Agent, or Firm*—Sixbey, Friedman, Leedom & Ferguson

[57] ABSTRACT

The running gear comprises a tilting beam having one end hinged to the vehicle about a tilt pin and supporting a rotary axle for at least one wheel, a blade spring having a first end fixed to the vehicle and a second end hinged to a first end of a shock absorber having a second end hinged to the vehicle, and a control actuator hinged firstly to the second end of the blade spring and secondly to a tilting control pin carried by the tilting beam at a point that is spaced apart from the tilting pin in order to control the tilt of the tilting beam.

6 Claims, 6 Drawing Sheets

FIG_1

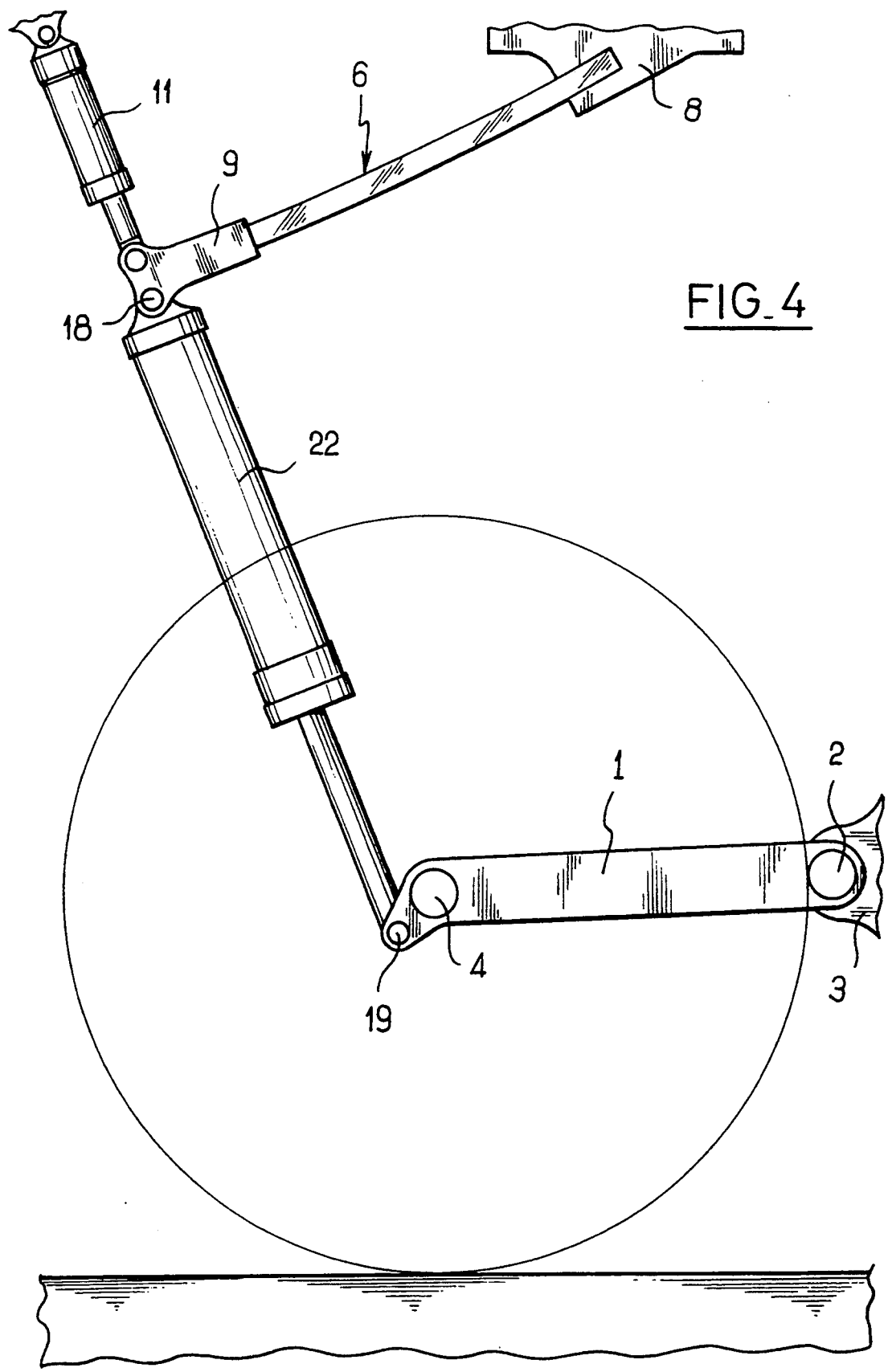
FIG_4

RETRACTABLE RUNNING GEAR FOR A VEHICLE THAT IS SUPPORTED WITHOUT CONTACT

The present invention relates to a retractable running gear for a vehicle that is supported without contact.

BACKGROUND OF THE INVENTION

It is known that vehicles which are supported without contact, e.g. vehicles supported by magnetic levitation or by a cushion of air need to possess retractable running gear firstly for emergency support in the event of failure of the system for providing support without contact, and secondly for support and braking of the vehicle when stopped.

SUMMARY OF THE INVENTION

The invention provides retractable running gear for a vehicle that is supported without contact, the running gear comprising a tilting beam having one end hinged to the vehicle about a tilt pin and supporting a rotary axle for at least one wheel, a blade spring having a first end secured to the vehicle and a second end hinged to a first end of a shock absorber having a second end hinged to the vehicle, and a control actuator associated in a hinged manner firstly to the second end of the blade spring and secondly with a tilting control pin carried by the tilting beam at a point that is spaced apart from the tilting pin in order to control the tilt of the tilting beam.

In an embodiment of the invention, the control actuator has a first end hinged to the vehicle and a second end hinged to a linkage comprising a link and a lever that are hinged to each other and that have ends respectively hinged to the second end of the blade spring and to the tilting control pin. Thus, when the hinged links are in line with one another, the running gear is in its extended position and forces applied to the wheel are transmitted to the blade spring and to the shock absorber without passing via the control actuator.

In a variant of this embodiment of the invention, the first end of the control actuator is secured in hinged manner to the tilting beam.

In another embodiment of the invention, the control actuator has a first end hinged to the second end of the blade spring, and a second end hinged to the tilting control pin.

BRIEF DESCRIPTION OF THE DRAWINGS

Embodiments of the invention are described by way of example with reference to the accompanying drawings, in which:

FIG. 4 is an elevation view of a second embodiment of the running gear in a lowered position.

DETAILED DESCRIPTION

Figure 1:
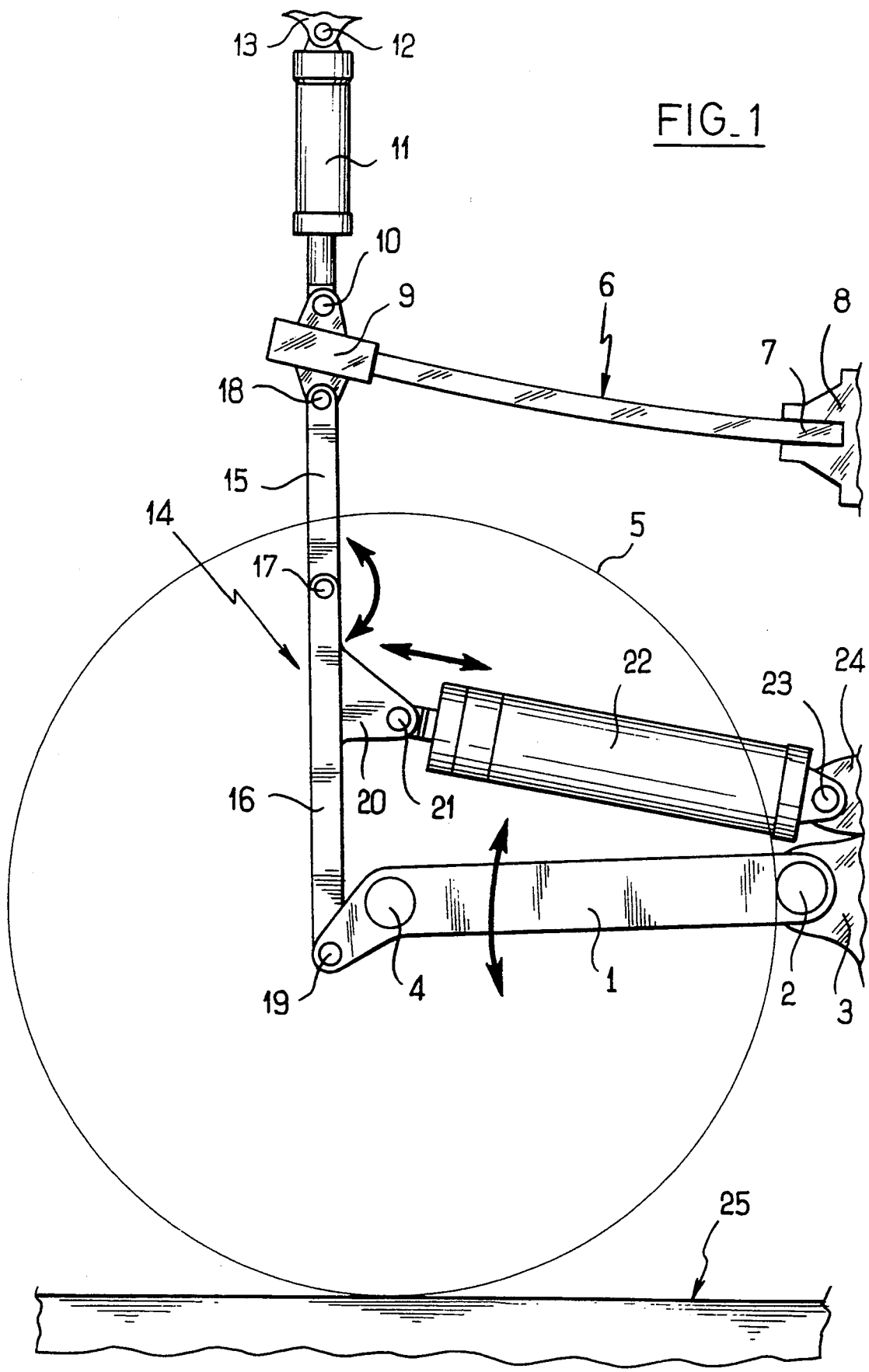
FIG. 1 is an elevation view of a first embodiment of the invention with the running gear in a lowered position.
Figure 2:
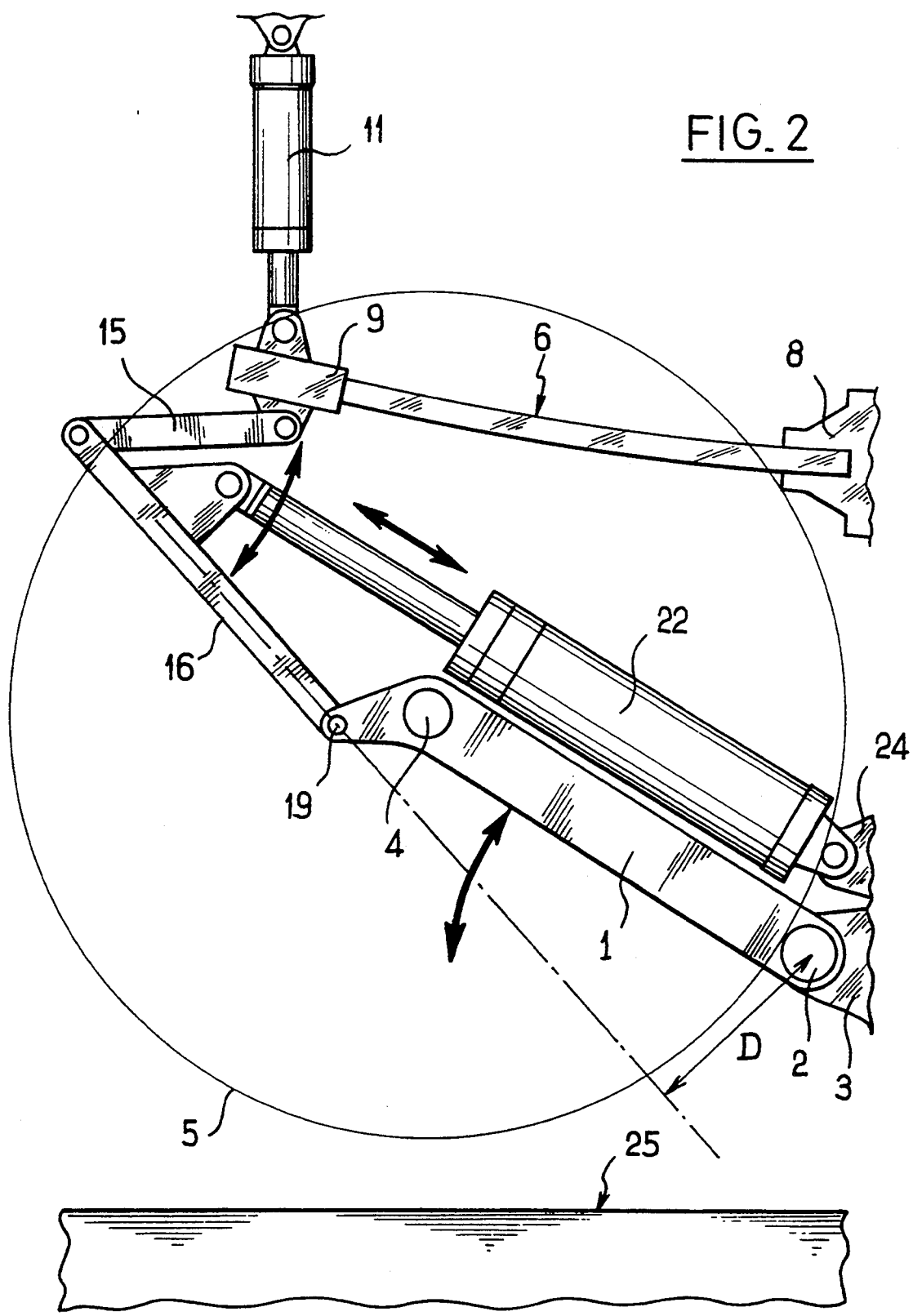
FIG. 2 is a view analogous to FIG. 1 with the running gear in a retracted position.

With reference to FIGS. 1 and 2, a first embodiment of retractable running gear of the invention comprises a tilting beam 1 having one end hinged about a tilt pin 2 carried by a lug 3 secured to the chassis of the vehicle. The tilting beam 1 supports a rotary axle 4 for one or more wheels disposed in parallel and represented in the figures by fine line 5.

A blade spring 6 is disposed above the tilting beam 1 and has a first end 7 secured in non-hinged manner in a lug 8 forming part of the vehicle chassis, and a second end secured in non-hinged manner an assembly piece 9 which is hinged at 10 to a first end of a shock absorber 11 that extends substantially vertically above the second end of the blade spring 6, and itself having a second end hinged at 12 to a lug 13 forming part of the vehicle chassis.

The second end of the blade spring 6 is also connected to the tilting beam 1 by a linkage given overall reference 14 and comprising a link 15 and a lever 16 which are hinged to each other about a hinge 17. The top end of the link 15 is hinged at 18 to the assembly piece 9, and the bottom end of the lever 16 is hinged about a tilting control pin 19 carried by the tilting beam 1. The lever 16 also includes a gusset plate 20 carrying a hinge 21 which is connected to one end of a control actuator 22 whose other end is connected to a hinge 23 carried by a lug 24 forming part of the vehicle chassis.

In the lowered position of the running gear as shown in FIG. 1, the control actuator 22 is retracted, the link 15 and the lever 16 are in alignment with each other, and the wheels 5 are then in contact with a running track 25. The blade spring 6 thus supports the weight of the vehicle while the shock absorber 11 damps the oscillations to which the vehicle is subjected by running along the track 25. The link 15 and the lever 16 are preferably kept in alignment by providing either a control actuator that has internal locking as in the embodiment shown in the figures, or else, in conventional manner, a locking system that includes abutments carried by the link 15 and the lever 16, with the link and the lever being urged towards an abutment position by a spring. The alignment may also be maintained by locking the control actuator 22 hydraulically. When the vehicle is supported by its means for providing support without contact, the control actuator 22 is actuated to lengthen so as to break the alignment of the link 15 and the lever 16, as shown in FIG. 2, thereby causing the tilting beam 1 to tilt upwards and retracting the wheels 5 into appropriate housings (not shown) provided on the vehicle. It will be observed in FIG. 2 that the wheels 5 are no longer in contact with the running track 25 but that the ground clearance of the vehicle while it is being supported without contact is generally less than the ground clearance of the vehicle when its running gear is lowered. While the running gear is being lowered, the control actuator 22 must thus provide sufficient torque on the tilting beam 1 to lift the vehicle as from the moment the wheels 5 come into contact with the running track 25. To this end, the tilting beam 1 is preferably curved at its end adjacent to the tilting control pin 19 so that said tilting control pin is offset from the longitudinal direction of the tilting beam.

Thus, when the control actuator 22 is in its fully extended position, as shown in FIG. 2, and the tilting beam 1 is substantially parallel to the control actuator 22, the lever 16 which transmits downwards force to the gear which is pressed against the control actuator 22 when retracted is offset far enough for there to be sufficient distance D (see FIG. 2) between the axis of the tilting pin 2 and the direction along which force is applied to the tilting control pin 19.

In addition, it will also be observed that the relative positions of the fixing lug 8 for the first end 7 of the blade spring 6 and the fixing lug 13 for the shock absorber 11 are chosen so as to ensure that the spring blade 6 is kept under prestress regardless of the configuration of the running gear. In particular, in the example shown in FIGS. 1 and 2 where the shock absorber 11 is substantially vertical and the blade spring 6 is substantially horizontal, it suffices for the vertical offsets between the lugs 13 and 8 to be greater than the length of the shock absorber 11 when in its fully extended position. The blade spring 6 remains prestressed even when the running gear is fully retracted as shown in FIG. 2. The assembly piece can then be considered as a fixed point and the internal locking of the control actuator 22 therefore ensures that the running gear assembly is fully immobilized.

Figure 3:
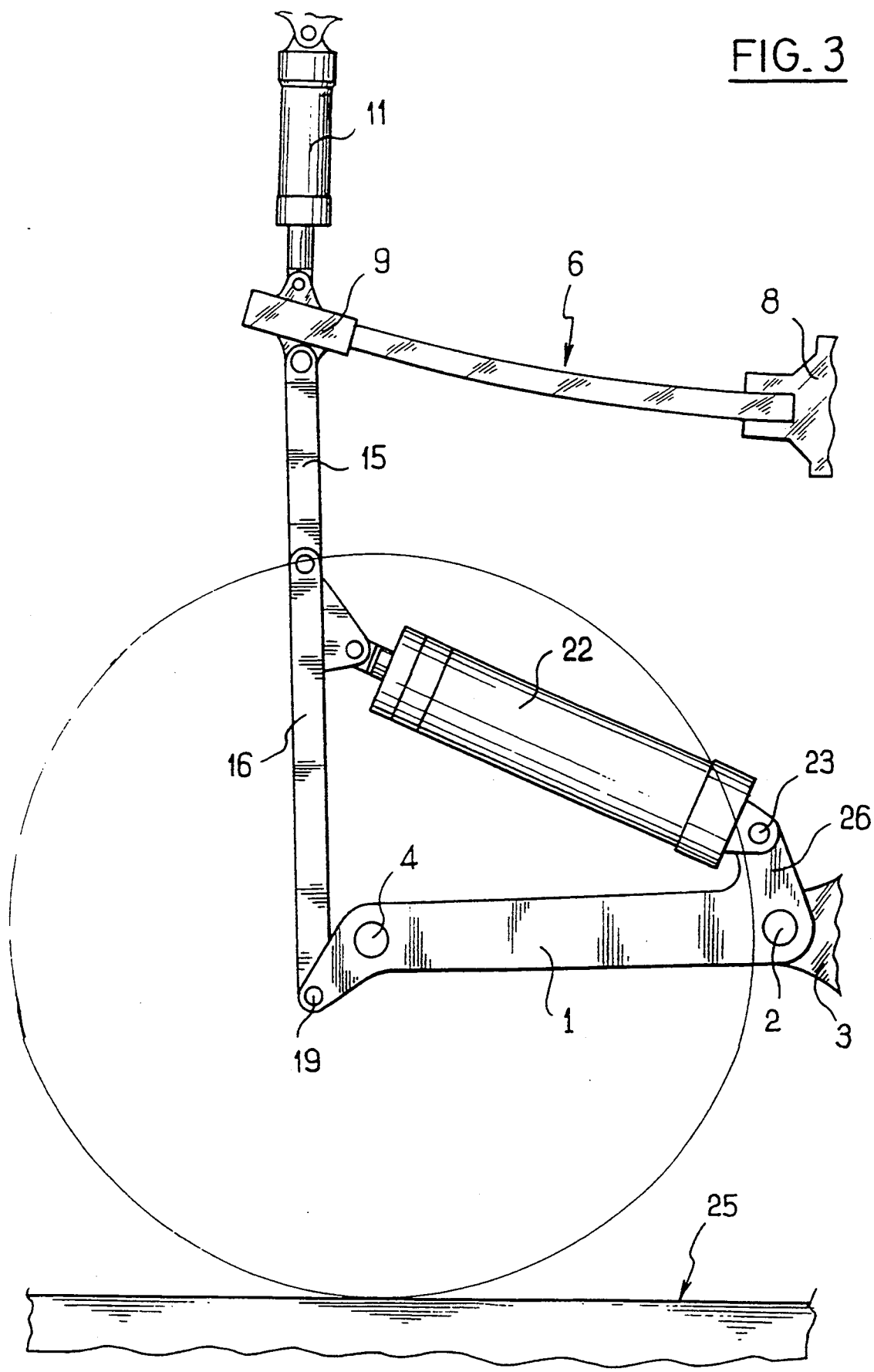
FIG. 3 is an elevation view of a variant of the FIG. 1 embodiment shown with the running gear in its lowered position.
Figure 3A:
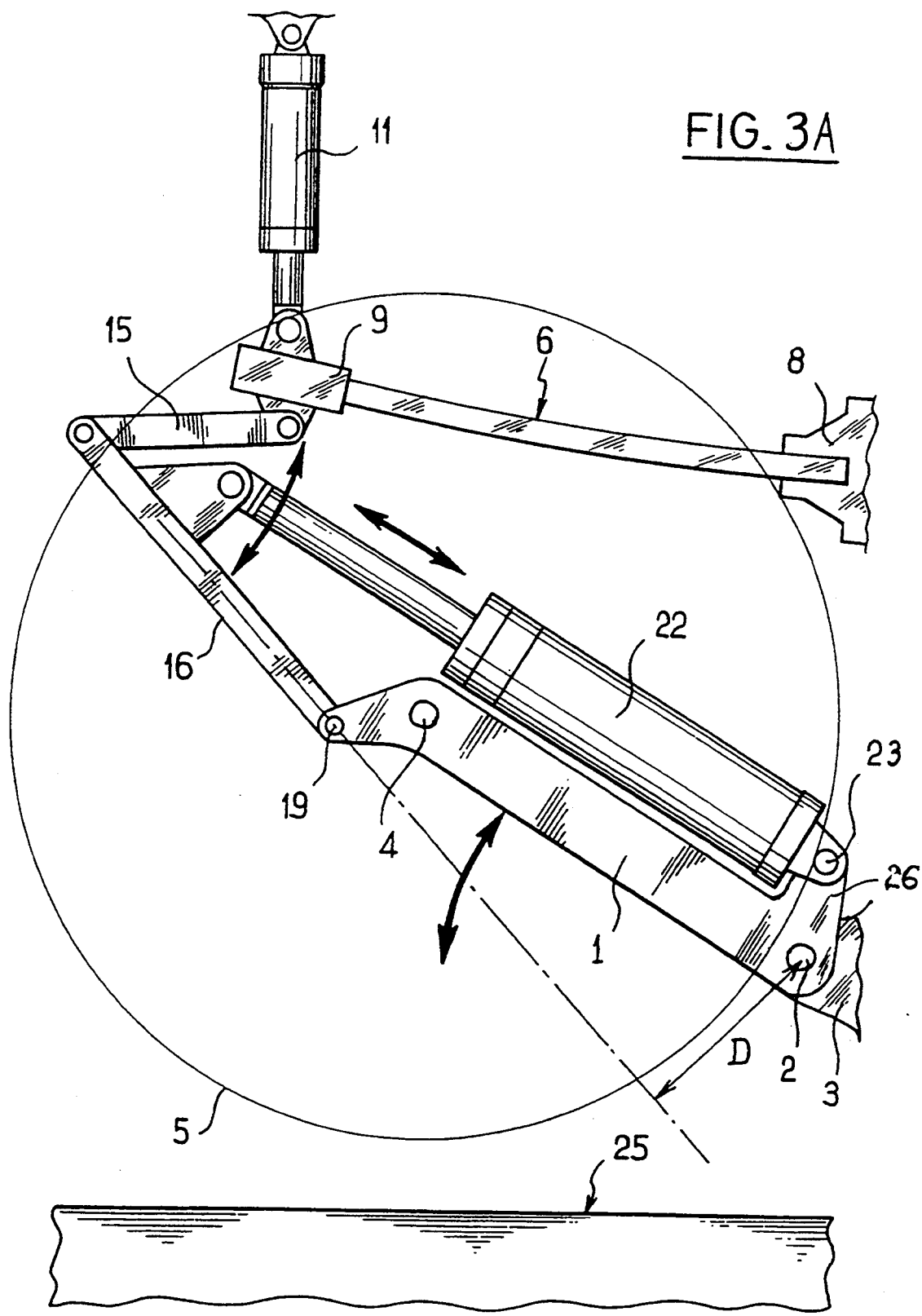
FIG. 3A is a view analogous to FIG. 3 with the running gear in a retracted position.

FIG. 3 shows a variant of the embodiment shown in FIGS. 1 and 2. In this variant, analogous elements are given the same numerical references. It can easily be seen that the only difference relative to the preceding embodiment is the way in which the control actuator 22 is secured, with it no longer being connected to the lug 24 on the vehicle as in the embodiment of FIGS. 1 and 2, but being secured to a lug 26 on the tilting beam 1. This uses one fixing point fewer on the vehicle, thereby making it possible to lighten the structure of the vehicle accordingly since the structure normally needs to be reinforced at each fixing point. In addition, when moving the running gear, the forces of the control actuator 22 are transmitted directly to the parts that are to be moved relative to one another, thereby obtaining better efficiency from the applied forces. For optimum efficiency of the applied forces, the lug 26 preferably extends in the opposite direction to the curved portion of the tilting beam that carries the tilting control pin 19 so that the hinge axis 23 of the control actuator 22 is offset on the side of the longitudinal axis of the tilting beam 1 that is opposite to the side on which the tilting control pin 19 is offset.

Figure 5:
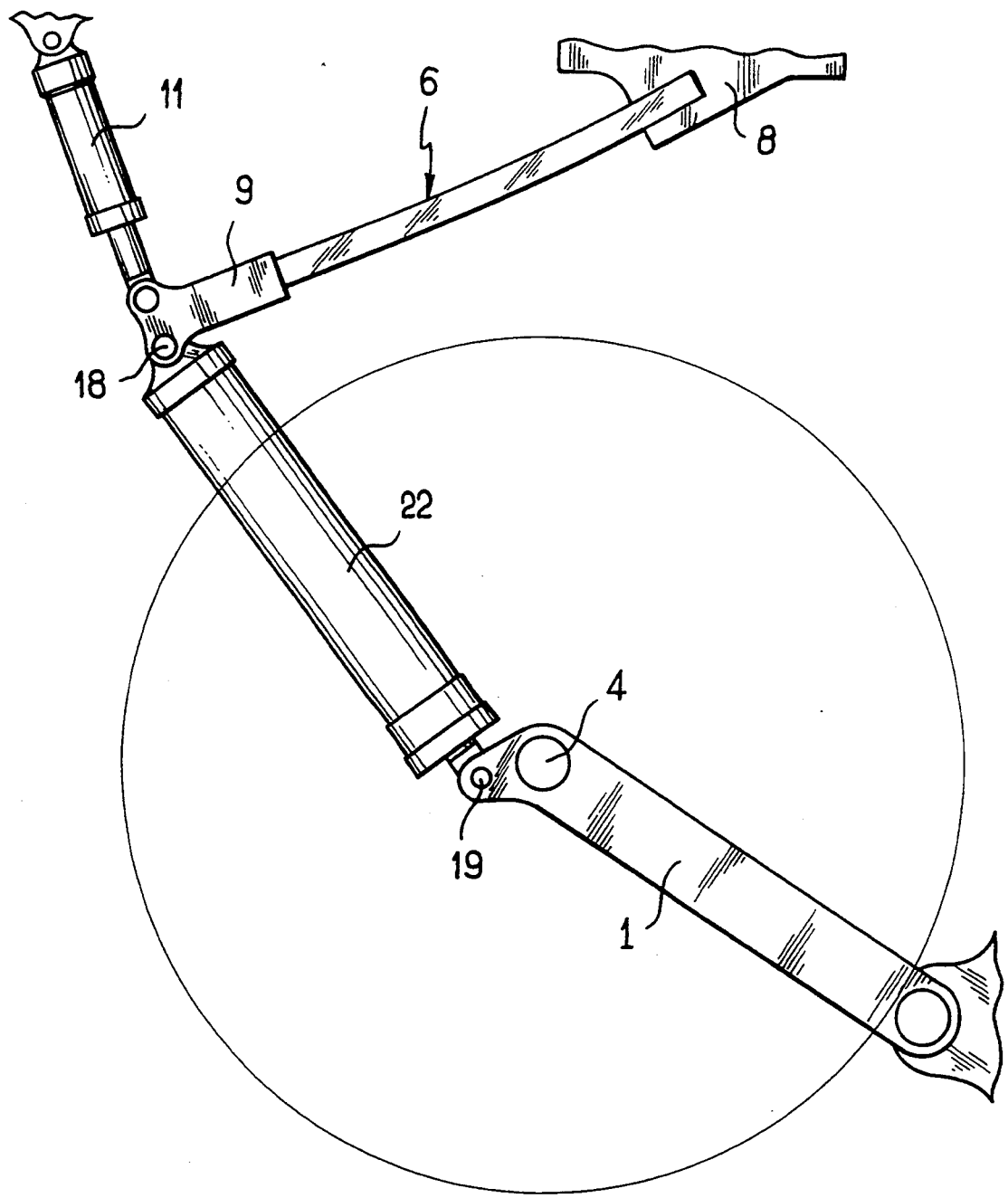
FIG. 5 is a view analogous to FIG. 4 with the running gear in a raised position.

FIGS. 4 and 5 show another embodiment of the invention in which the control actuator 22 is directly connected to the hinge 18 at the second end of the blade spring 6 and to the tilting control pin 19 carried by the tilting beam 1. To make better use of the available space, the blade spring 6 is preferably disposed obliquely as shown in these figures. This embodiment has the advantage of being very simple in structure, but it suffers from the drawback of the control actuator 22 carrying all of the vehicle load stresses when the running gear is in its lowered position, whereas in the above-described embodiments, these stresses are carried for the most part by the link 15 and the lever 16 being in alignment.

Naturally the invention is not limited to the embodiments shown and variants will occur to the person skilled in the art. In particular, although the running gear of the invention has been shown as having a single tilting beam from which the wheels 5 may be cantilevered out or disposed on either side thereof, it is possible to provide running gear including a plurality of tilting beams interposed between the wheels or disposed at the ends of a set of wheels mounted in parallel, with each tilting beam naturally being associated with its own control actuator, blade spring, and shock absorber.

I claim:

1. A retractable running gear for a vehicle, the running gear comprising a tilting beam having one end hingedly connected to the vehicle about a tilt pin and supporting a rotary axle for at least one wheel, a blade spring having a first end secured to the vehicle and a second end hingedly connected to a first end of a shock absorber, a second end of the shock absorber being hingedly connected to the vehicle, and a control actuator having a first end hingedly connected to the tilting beam about a hinge axis and a second end hingedly connected to a linkage, said linkage comprising a link and a lever hingedly connected to each other with opposite ends respectively hingedly connected to the second end of the blade spring and to a tilting control pin carried by the tilting beam at a point that is spaced apart from the tilt pin for controlling the tilt of the tilting beam, said tilting beam being elongated so as to define a longitudinal direction wherein said tilting beam hinge connection and the tilting control pin are offset from said longitudinal direction of said tilting beam, said link and lever being in alignment with each other and with the shock absorber when the running gear is in a lowered position.

2. Running gear according to claim 1, wherein said tilting beam is elongated so as to define a longitudinal direction and the tilting control pin is offset from said longitudinal direction of said tilting beam.

3. Running gear according to claim 1, wherein the first end of the blade spring and the second end of the shock absorber are in relative positions such that a bending stress is maintained on the blade spring in all positions of the running gear.

4. A retractable running gear for a vehicle, the running gear comprising a tilting beam having one end hingedly connected to the vehicle about a tilt pin and supporting a rotary axle for at least one wheel, a blade spring having a first end secured to the vehicle and a second end hingedly connected to a first end of a shock absorber, a second end of the shock absorber being hingedly connected to the vehicle, and a control actuator having a first end hingedly connected to the second end of the blade spring and a second end hingedly connected to a tilting control pin carried by the tilting beam at a point that is spaced apart from the tilt pin for controlling the tilt of the tilting beam, said control actuator and said shock absorber being in alignment with each other when the running gear is in a lowered position.

5. Running gear according to claim 4, wherein the first end of the blade spring and the second end of the shock absorber are in relative positions such that a bending stress is maintained on the blade spring in all positions of the running gear.

6. Running gear according to claim 4, wherein said tilting beam is elongated so as to define a longitudinal direction and the tilting control pin is offset from said longitudinal direction of said tilting beam.

* * * * *